United States Patent [19]

Lambillotte et al.

[11] Patent Number: 4,733,709

[45] Date of Patent: Mar. 29, 1988

[54] RADIAL TIRE WITH A REINFORCED BUTT SPLICE CARCASS PLY AND METHOD OF MAKING

[75] Inventors: Bruce D. Lambillotte, Akron; Jimmie L. Scott, Stow, both of Ohio

[73] Assignee: General Tire, Inc., Akron, Ohio

[21] Appl. No.: 889,559

[22] Filed: Jul. 25, 1986

[51] Int. Cl.[4] .................... B29D 30/20; B60C 9/09
[52] U.S. Cl. .................... 152/548; 152/560; 152/561; 156/134; 156/304.3
[58] Field of Search ............ 152/560, 561, 538, 548, 152/558, 559, 527, 530, 563; 156/304.1, 304.3, 126, 133, 134, 304.5, 304.4, 304.7, 308.4

[56] References Cited

U.S. PATENT DOCUMENTS

| | | | |
|---|---|---|---|
| 596,930 | 1/1898 | Wykerr | 152/563 |
| 1,043,143 | 11/1912 | Raymond | 152/563 |
| 2,524,456 | 10/1950 | Masland, II | 156/304.4 |
| 3,677,318 | 7/1972 | Glass et al. | 152/560 |
| 3,841,376 | 10/1974 | Paulin et al. | 152/538 |
| 3,962,022 | 6/1976 | Bottasso et al. | 156/507 |
| 4,466,473 | 9/1984 | Matyja et al. | 152/560 |

Primary Examiner—Jerome Massie IV
Assistant Examiner—David Herb

[57] ABSTRACT

A reinforcement for the butt splice of the carcass ply of a radial tire, is described as having two sets of polymeric cords or strands which are in cross-hatched relation and which cross adjacent reinforcement cords of the carcass ply at opposite angles A and B of 45°. These strands pantograph in response to radial or circumferential forces exerted against the tire, to resist relative movement between opposing abutting ends of the carcass ply and butt splice.

11 Claims, 2 Drawing Figures

RADIAL TIRE WITH A REINFORCED BUTT SPLICE CARCASS PLY AND METHOD OF MAKING

BACKGROUND OF INVENTION

The invention relates to a radial tire, especially the formation of the unvulcanized rubber carcass ply of the tire on a tire building drum. In building a radial tire, the unvulcanized carcass ply is placed on the building drum such that the reinforcement cords of the ply extend longitudinally of the drum. The tire builder normally cuts the carcass ply, so that the opposing ends of the ply are overlapped. The overlapped ends are pressed together to form what is known as a lap joint or splice. It has been found that such joints tend to produce an unslightly waviness in the adjacent sidewalls of the finished tire. Such waviness can be eliminated or substantially reduced by using a butt splice, wherein the opposing ends of the carcass ply are in abutting relation and not overlapped.

Butt splices are old as evidenced by U.S. Pat. No. 1,043,143 which discloses the use of a fabric, conventionally woven from a soft weft thread 15 and a small warp cord 16, for covering the butt splice of a carcass ply of a bias-type tire where the reinforcement cords of the ply extend angularly across the tire building drum and not longitudinally of the drum. It appears from the drawing of the U.S. Pat. No. 1,043,143 that the warp cords of the fabric are parallel to the reinforcement cords of the bias carcass ply. The invention is directed to a unique reinforcement which reacts to maintain the butt splice intact by resisting the radial and circumferential forces that are exerted against the tire, especially during the expansion of the tire from a cylindrical to a toroidal shape.

SUMMARY OF INVENTION

Briefly stated, the invention is in a butt splice of the carcass ply of a radial tire. As previously indicated, the carcass ply is positioned on the tire building drum such that the reinforcement cords of the ply extend longitudinally of the drum. A reinforcement strip, composed of two sets of oppositely disposed cords which are angularly disposed to the reinforcement cords of the carcass ply are layered over the butt splice. Any radial or circumferential forces acting longitudinally or at right angles against the reinforcement cords of the carcass ply cause a scissoring or pantographing of the cords of the reinforcement strip to resist relative movement of the abutting ends of the carcass ply.

DESCRIPTION OF DRAWING

The following description of the invention will be better understood by having reference to the accompanying drawing, wherein.

ENVIRONMENT OF INVENTION

Figure 1:
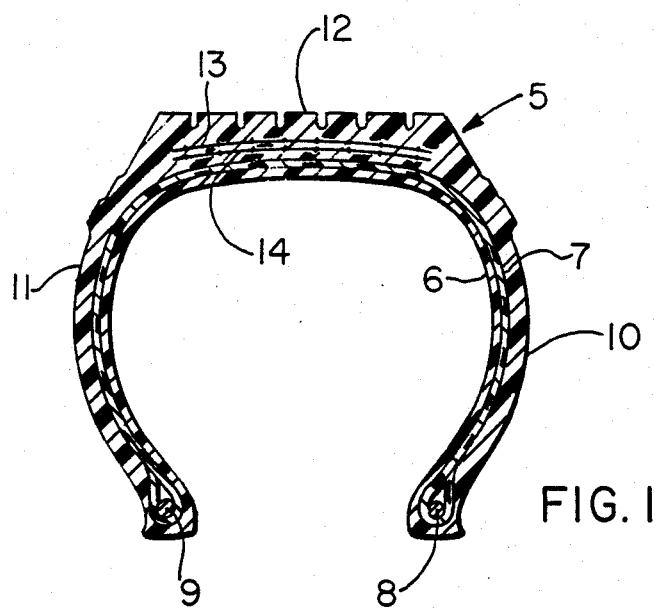
FIG. 1 is a cross-section of a radial tire.
Figure 2:
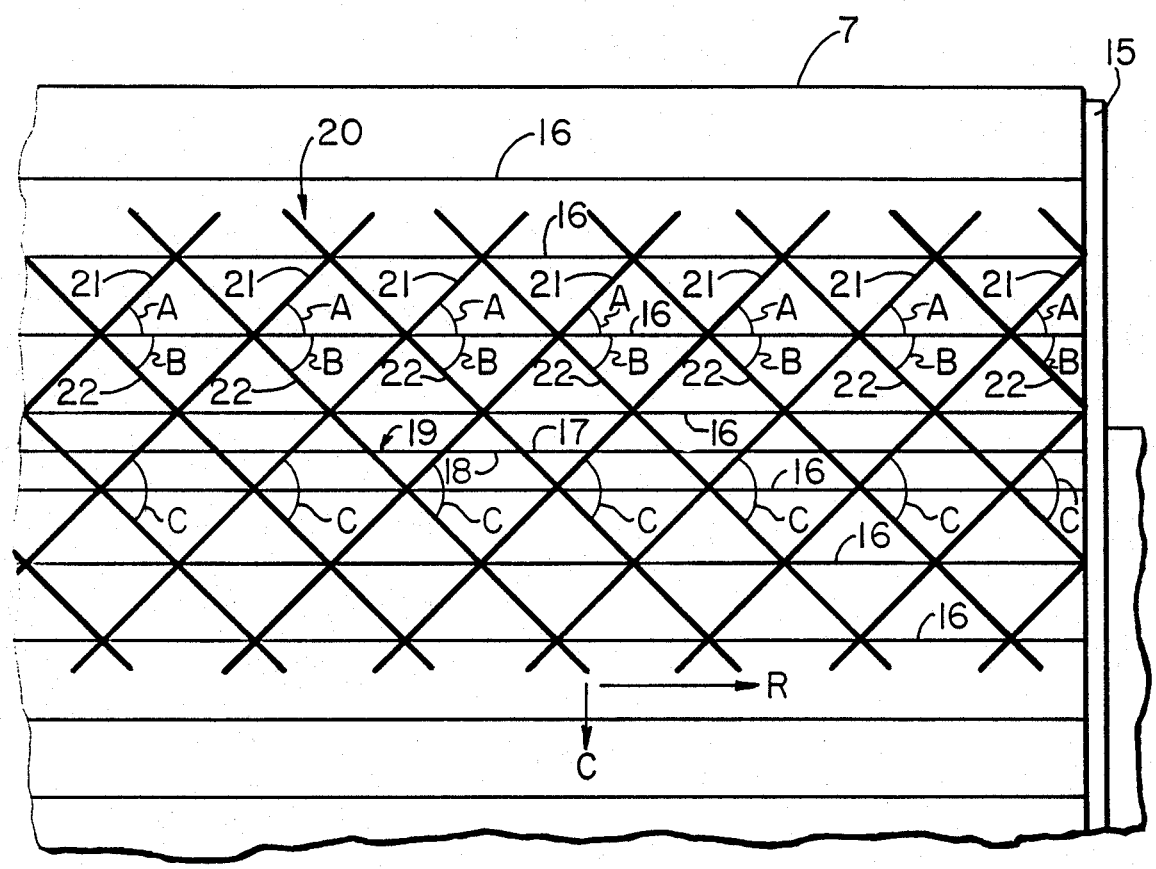
FIG. 2 is an enlarged butt splice of a carcass ply which is reinforced in accordance with the invention.

With reference to FIG. 1, there is shown a radial tire 5 which comprises the essential components of a fluid impervious inner liner 6, a carcass ply 7 terminating at a pair of tire beads, 8, 9, a pair of outer, exposed sidewalls 10, 11, a tread 12, and a pair of juxtaposed belts 13, 14 sandwiched between the carcass ply 7 and the tread 12 for circumferentially reinforcing the radial tire 5. The carcass ply 7 is reinforced with a number of radially oriented parallel cords 16 of any suitable material, e.g. rayon, nylon, or polyester.

THE INVENTION

The radial tire 5 is built by successively wrapping the innerliner 6 and carcass ply 7 on, for example, a cylindrically shaped tire building drum 15. The carcass ply 7 is positioned, so that the reinforcement cords 16 of the ply extend longitudinally of the drum 15. Normally, the opposing ends 17, 18 of the carcass ply 7 are spliced together in overlapping relation. In this case, however, the opposing ends 17, 18 of the carcass ply 7 are brought together in abutting relation to form a butt splice or joint, generally indicated at 19. The butt splice 19 is then covered with a unique reinforcement strip 20 to prevent relative movement betwen the opposing ends 17, 18 of the carcass ply 7.

The strip 20 comprises a first set of parallel polymeric cords or strands 21 which are disposed to the reinforcement cords 16 of the carcass ply 7 at similar angles A of 45°, and a second set of parallel polymeric cords or strands 22 which are oppositely disposed to the reinforcement cords 16 of the carcass ply 7 at similar angles B of 45°, so that the included angles C between the crossing strands 21 and 22 of the strip 20 are each 90°. The cross-hatched strands 21, 22 of the strip 20 are, in this instance, covered with any suitable tacky rubbery material to hold the strands 21, 22 in position, during subsequent building operations of the radial tire 5. The thickness (gauge) of the strip 20 should not exceed 0.025 inches (0.6 mm). Other appropriate means can be used to maintain the strands 21, 22 in angular relation to each other. For example, smaller threads can be used to interlock the strands 21, 22 in angular relation, after which the interlocked strands 21, 22 can be treated with a suitable adhesive or bonding agent for promoting adhesion between the strands 21, 22 and unvulcanized rubbery material of the carcass ply 7.

A reinforcement strip 20 of 45° cut 70 denier, 14×14 knit bead, low gauge wrapping material comprised of tackified nylon strands was found to provide excellent characteristics for resisting separation of the butt splice 19. The nylon strands 21, 22 are covered with a resorcinaol formaldehyde latex to which is applied a natural or synthetic solvated rubber, (toluene being a recommended solvent) or by aqueous latex adhesives. The strands 21, 22 of nylon can be knitted or woven into reinforcement strips 20, such as the aforementioned bead wrapping fabric or material. The strands 21, 22 can be composed of other polymeric materials, e.g. rayon or polyester, so long as the strand material is substantially stronger than the thin weft threads of fabrics conventionally woven of warp cords and weft threads. It can be appreciated that greater similarity of the polymeric strands 21, 22, as to size and strength, produces more uniform pantographing of the strands and consequently greater resistance of the reinforcement strip 20 to relative movement between opposing ends 17, 18 of the carcass ply 7, especially during expansion of the carcass ply 7 from a cylindrical to a toroidal shape, where severe radial and circumferential forces R and C are exerted against the carcass ply 7 and butt splice 19.

Thus, there has been described a unique reinforcement for a butt splice which has the advantage of eliminating or substantially reducing unslightly waviness in the sidewalls of radial tires caused by normal overlapped splices used to join opposing ends of the carcass ply of the tire. The polymeric strands of the reinforcement strip are at 45° to the radial and circumferential directions to maximize pantographing resistance of the strip in both directions and not favor one direction at the expense of the other. The invention is especially useful in cases where the radial cords of the carcass ply are held in spaced relation by interwoven weft threads which pull against the butt splice during toroidal expansion of the tire.

What is claimed is:

1. A radial tire, comprising:
   (a) a carcass ply with opposing ends which are in abutting relation, the carcass ply reinforced with radially oriented parallel cords;
   (b) a reinforcement strip disposed in juxtaposed relation over the abutting opposing ends of the carcass ply, the strip having two sets of strands of polymeric material in cross-hatched relation, the strands of each set being parallel and the strands of the two sets being oppositely disposed relative to adjacent reinforcement cords of the carcass ply and at angles (A, B) thereto of substantially 45°, so that the strands pantograph in response to radial or circumferential forces exerted on the tire.

2. The radial tire of claim 1, wherein the strands are composed of polymeric material of the group of nylon, rayon, and polyester.

3. The radial tire of claim 2, wherein the strands are coated with a material which promotes adhesion between the strands and carcass ply.

4. The radial tire of claim 3, wherein the strands are composed of nylon which is coated with a tacky polymeric material.

5. The radial tire of claim 4, wherein the tackified nylon strands are substantially the same size and strength.

6. A method of building a radial tire, comprising:
   (a) placing on a cylindrical tire building drum, a carcass ply of unvulcanized rubbery material so that reinforcement cords of the ply extend longitudinally of the drum and so that said reinforcement cords extend in a radial direction in the finished tire;
   (b) joining opposing ends of the carcass ply in unlapped, abutting relation to form a butt splice between the ends;
   (c) reinforcing the butt splice with a narrow reinforcement strip which has two sets of polymeric strands in cross hatched relation which extend in opposite crossing relation with and at acute angles to the cords of the carcass ply, the strands being treated with a material which promotes adhesion between the strands and material of the carcass ply.

7. The method of claim 6, wherein the strands are composed of material of the group of nylon, rayon and polyester.

8. The method of claim 7, whrein the two sets of polymeric strands are at angles (A, B), relative to the cords of the carcass ply, of 45°, so that the included angle (C) between crossing strands of each set is 90°.

9. The method of claim 8, wherein the strands are composed of nylon which is covered with a tacky rubbery material.

10. The radial tire of claim 3, which includes weft threads interwoven with the reinforcement cords of the carcass ply to maintain said cords in spaced relation.

11. The method of claim 9, wherein reinforcement cords of the carcass ply are held in spaced relation by interwoven weft threads.

* * * * *